United States Patent [19]

Murai

[11] Patent Number: 5,328,108
[45] Date of Patent: Jul. 12, 1994

[54] METHOD FOR WINDING COILS ON A Y-CONNECTION ARMATURE FOR MINIATURE MOTORS

[75] Inventor: Kunitake Murai, Matsudo, Japan

[73] Assignee: Mabuchi Motor Co., Ltd., Chiba, Japan

[21] Appl. No.: 812,709

[22] Filed: Dec. 23, 1991

[30] Foreign Application Priority Data

Dec. 25, 1990 [JP] Japan .................................. 2-413714

[51] Int. Cl.⁵ .............................................. H02K 15/09
[52] U.S. Cl. ........................................ 242/7.03; 29/596
[58] Field of Search ......................... 242/7.30, 1.1 R; 29/596, 605; 310/179, 234

[56] References Cited

U.S. PATENT DOCUMENTS

| | | | |
|---|---|---|---|
| 4,307,311 | 12/1981 | Grozinger | 29/596 |
| 4,351,102 | 9/1982 | Grozinger et al. | 242/1.1 R X |
| 4,594,523 | 6/1986 | Horita et al. | 29/596 X |

*Primary Examiner*—Andrew M. Falik
*Attorney, Agent, or Firm*—McGlew and Tuttle

[57] ABSTRACT

A method for winding coils on a Y-connection armature for miniature motors, the motor typically including an armature iron core of a multi-pole construction, a commutator and a common terminal plate. Each of the commutator and the common terminal plate are disposed in a mutually insulated state on an insulating cylinder fixedly fitted to an armature shaft. A plurality of coils are wound on the armature iron core. Lead wires of the coils are connected to tongues of the commutator and the common terminal plate. Ends of the lead wires wound on the coils, other than the last coil, are extended across a predetermined commutator tongue and a tongue of the common terminal plate adjacent to the commutator tongue without being cut. The lead wire is connected to the tongues of the commutator tongue and the common terminal plate. Subsequently, the lead wire which is disposed across the commutator tongue and the common terminal plate tongue is cut.

4 Claims, 4 Drawing Sheets

METHOD FOR WINDING COILS ON A Y-CONNECTION ARMATURE FOR MINIATURE MOTORS

BACKGROUND OF THE INVENTION

This invention relates generally to a method for winding coils on a Y-connection armature for miniature motors, and more particularly to a method for winding coils on a Y-connection armature for miniature motors, which leads itself to simplification of the process for winding coils on a Y-connection armature and improvement of production efficiency.

FIG. 1 is a longitudinal sectional view illustrating the essential part of a miniature motor to which this invention is applied. In FIG. 1, reference numeral 21 refers to a motor housing, made of a magnetic material, such as mild steel, formed into a deep cup shape, a field magnet 22 is fixedly fitted to the inner circumferential surface of the motor housing 21. Numeral 23 refers to an end plate, fitted to an open end of the motor housing 21. Numeral 24 refers to an armature comprising an armature iron core 2, a commutator 5, and an armature shaft 1 fixedly fitted to the axial center thereof. Numerals 25 and 26 refer to bearings provided on the motor housing 21 and the end plate 23 to rotatably support the armature shaft 1. Numeral 27 refers to a terminal provided on the end plate 23. Numeral 28 refers to a brush electrically connected to the terminal 27, and formed in such a manner as to make sliding contact with the commutator 5.

With this construction, as electric current is fed from the terminal 27 to the armature via the brushes 28 and the commutator 5, the armature 24 disposed in a magnetic field formed by the field magnet 22 fixedly fitted to the inner circumferential surface of the motor housing 21 is caused to rotate.

FIGS. 2 and 3 are a side view and an enlarged longitudinal sectional side view illustrating the armature shown in FIG. 1. In FIGS. 2 and 3, numeral 2 refers to an armature iron core comprising three armature poles 7 and an armature shaft fixedly fitted to the axial center thereof; numeral 4 to an insulating cylinder fixedly fitted to an end of the armature shaft 1; numeral 5 to a commutator having three tongues 6 on the outer circumferential surface thereof and fixedly fitted to the outer circumferential surface of the insulating cylinder 4; numeral 10 to a common terminal plate having three tongues 11 on the outer circumferential surface thereof and fixedly fitted to the outer circumferential surface of the insulating cylinder 4 via an insulating ring-shaped member 12. The tongues 6 and 11 should preferably be disposed at essentially the same circumferential and axial positions.

Numeral 9 refers to a coil wound in a slot 3 formed on the armature iron core 2. An end of a lead wire 8 is connected to the tongue 6 of the commutator 5 and the other end thereof is connected to the tongue 11 of the common terminal plate 10 to form a Y-connection armature.

FIG. 4 is a development of assistance in explaining the conventional method for winding coils on a Y-connection armature. Like parts are indicated by like numerals in FIGS. 2 and 3. In FIG. 4, 71, 72 and 73 refer to armature poles disposed at 120-degree intervals with each other to form an armature iron core 2 in FIGS. 2 and 3. Numerals 61, 62 and 63 refer to tongues, representing the positions at which the tongues 6 of the armature 5 in FIGS. 2 and 3 are disposed. Numerals 111, 112 and 113 refer to tongues, representing the positions at which the tongues 11 provided on the common terminal plate 10 in FIGS. 2 and 3 are disposed. The tongues 61–63, and 111–113 are disposed at 120-degree intervals with each other, as in the case of the armature poles 71–73.

With the above-mentioned construction, a conventional method for winding coils on the Y-connection armature will be described. A first coil 91 is wound by connecting a trailing end of the lead wire 8 to the first tongue 61, then winding the lead wire 8 on the first armature pole 71 to form the first coil 91, and connecting the trailing end of the lead wire 8 to the first tongue 111 of the common terminal plate 10. After the terminal wire 8 is connected to the tongues 61 and 111 the lead wire 8 is subjected to the wire-end termination (a wire end termination procedure). Although only one turn of the first coil 91 is shown in FIG. 4 for simplicity, the coil 91 has a predetermined number of turns. This holds true with the second and third coils 92 and 93.

When winding the second and third coils 92 and 93, ends of the lead wires 8 are wound on the second and third armature poles 72 and 73 to form the second and third coils 92 and 93, and the other ends, that is, the trailing ends of the lead wires 8 are connected to the second and third tongues 112 and 113 of the common terminal plate 10.

In the conventional method for winding coils on a Y-connection armature as described above, the wire-end termination treatment has to be performed on the leading and trailing ends of the lead wire 8 every time one coil is formed.

That is, two wire-end terminations are needed for one coil. Consequently, 2N times of wire-end terminations are needed for N pieces of coils wound on a Y-connection armature.

Since the conventional method for winding coils on a Y-connection armature requires multiple wire-end terminations, as described above, coil winding is time consuming, requires complex winding operations, leading to lower production efficiency. This also results in increased motor cost.

SUMMARY OF THE INVENTION

It is an object of this invention to provide a method for winding coils on a Y-connection armature for miniature motors, which makes it easy to manufacture Y-connection armatures, and simplifies coil-winding operations.

It is another object of this invention to provide a method for winding coils on a Y-connection armature for miniature motors which can improve production efficiency.

DETAILED DESCRIPTION OF THE EMBODIMENTS

Figure 1:
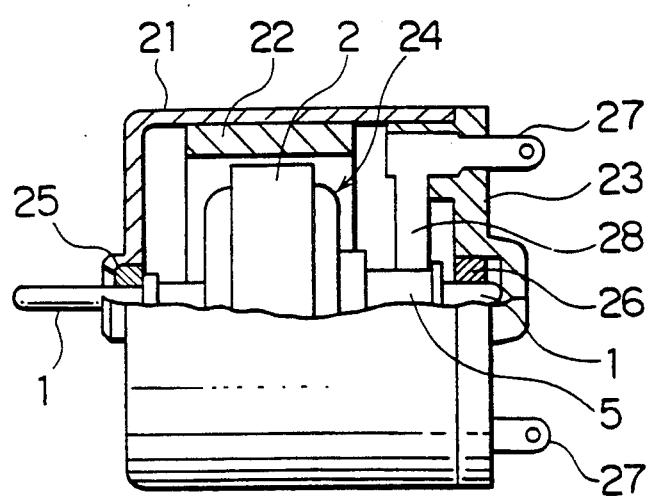
FIG. 1 is a longitudinal sectional view of the essential part of a miniature motor to which this invention is applied.
Figure 2:
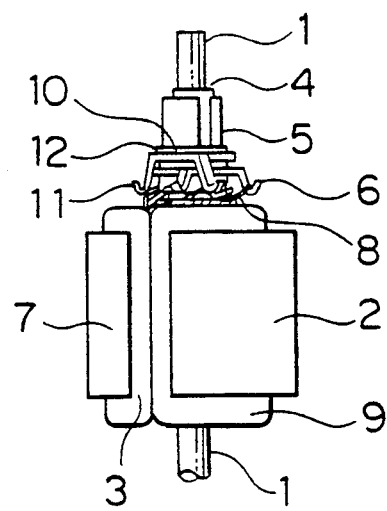
FIG. 2 is a side view of an armature of a miniature motor to which this invention is applied.
Figure 3:
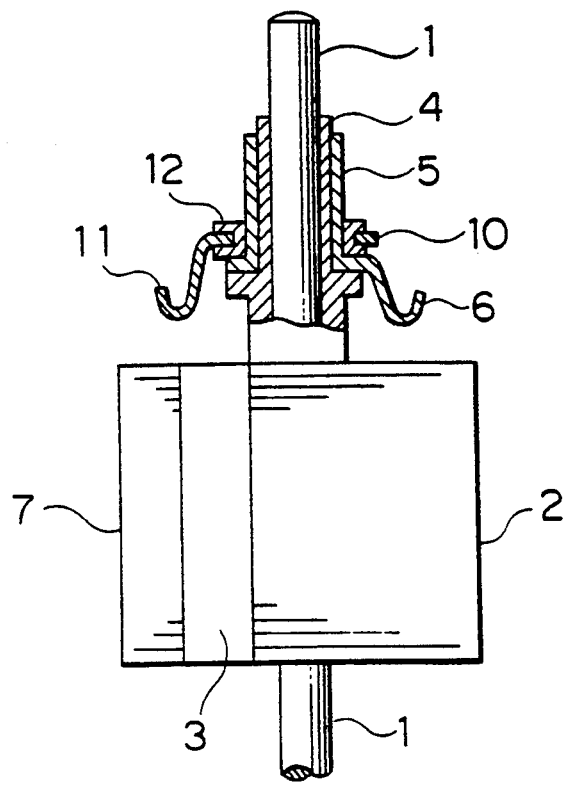
FIG. 3 is an enlarged longitudinal sectional side view of the essential part of an armature of a miniature motor to which this invention is applied.
Figure 4:
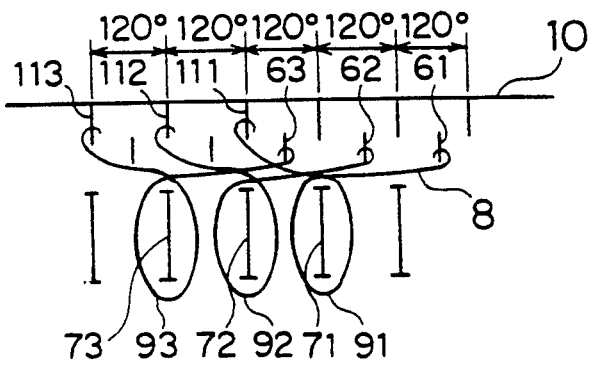
FIG. 4 is a development of assistance in explaining a conventional method for winding coils on a Y-connection armature.

Like parts are indicated by like numerals in FIGS. 2 through 4. The intervals among the armature poles 71, 72 and 73, among the tongues 61, 62 and 63 of the commutator 5, and among the tongues 111, 112 and 113 of the common terminal plate 10 are set to 120 degrees.

Figure 5:
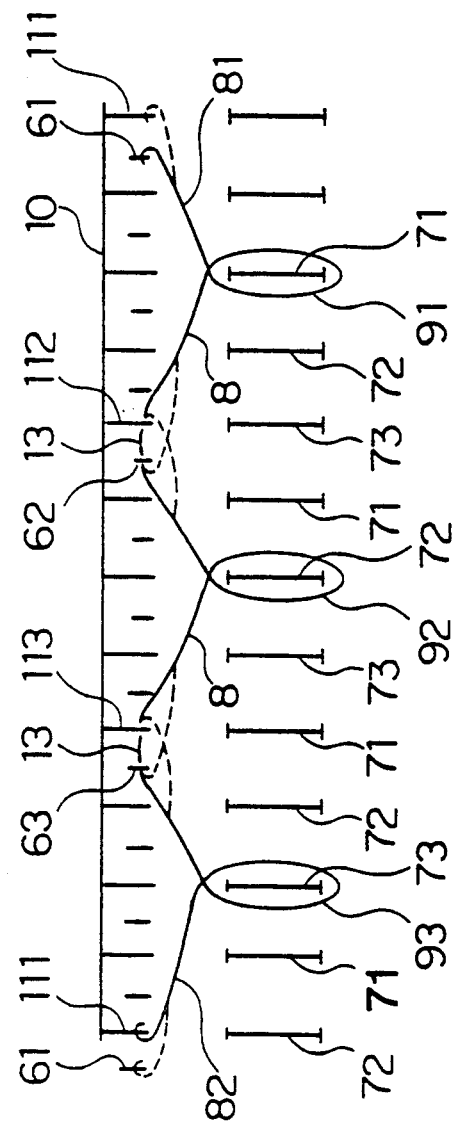
FIG. 5 is a development of assistance in explaining a coil-winding method embodying this invention.
Figure 6:
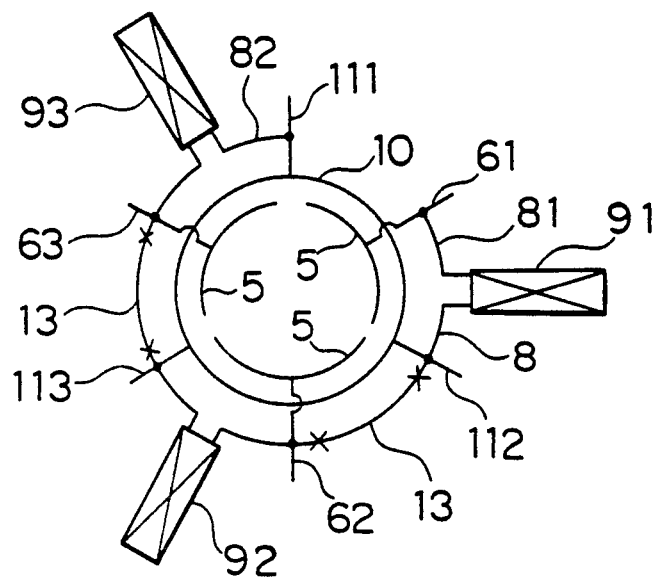
FIG. 6 is a diagram of assistance in explaining the essential part in which coils are wound in an embodiment of this invention.

In FIGS. 5 and 6, the leading end 81 of the lead wire 8 of the first coil 91 is connected to the first tongue 61 of the commutator 5, and then subjected to the wire-end terminating treatment after the unnecessary part thereof is cut off. The wire-end terminating treatment may be performed during coil winding, which will be described later, or after the completion of coil winding. The lead wire 8 is then wound on the first armature pole 71 to form the first coil 91. The lead wire 8 drawn from the first coil 91 is extended and connected to the second tongue 112 of the common terminal plate 10 corresponding to the second tongue 61.

The lead wire 8 connected to the second tongue 112 of the common terminal plate 10 is extended and connected to the second tongue 62 of the commutator 5, without being cut. The lead wire 8 is then extended and wound on the second armature pole 72 to form the second coil 92. Just in the same manner as above, the lead wire 8 of the second coil 92 is connected to the third tongue 113 of the common terminal plate 10 and the third tongue 63 of the commutator 5, and then extended and wound on the third armature pole 73 to form the third coil 93. The trailing end 82 of the lead wire 8 on the third coil 93 is subjected to wire-end termination after being connected to the first tongue 111 of the common terminal plate 10.

When coil winding is started with the connection of the leading end 81 of the lead wire 8 to the tongue 111 of the common terminal plate 10, the lead wire 8 is wound to form the coils 91, 92 and 93, and then connected to the first through third tongues 61, 62 and 63 of the commutator 5, as shown by dotted lines in the figure, and the trailing end 82 is led to the first tongue 61 of the commutator 5.

After the coils 91, 92 and 93 are formed by winding the lead wire 8, the bridging wires 13 bridging across the second tongues 62 and 112, and across the third tongues 63 and 113 are cut at positions shown by mark x in FIG. 6. Thus, the entire process of winding coils on a Y-connection armature is completed.

FIGS. 7 through 10 are diagrams illustrating the connection of the lead wire among the tongues in another embodiment of this invention. Like parts are indicated by like numerals in FIGS. 2 and 3.

Figure 7:
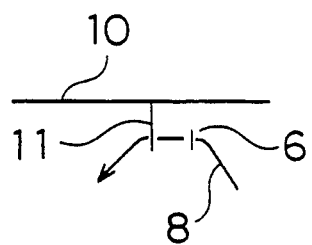
FIGS. 7 through 10 diagrams of assistance in explaining the state where lead wires are connected to tongues in another embodiment of this invention.

FIG. 7 shows the state where the lead wire 8 is connected in an almost straight line toward the tongue 11 of the common terminal plate 10. Although the direction in which the lead wire 8 is extended is different from the embodiment shown in FIG. 5, the operation after the lead wire 8 is connected is the same as with the previous embodiment.

Figure 8:
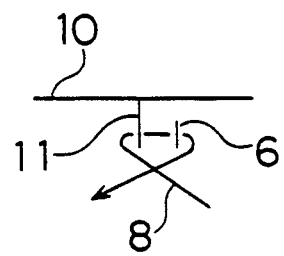

FIG. 8 shows the state where the lead wire 8 is disposed in an almost α shape across the tongues 6 and 11, and then connected to them.

Figure 9:
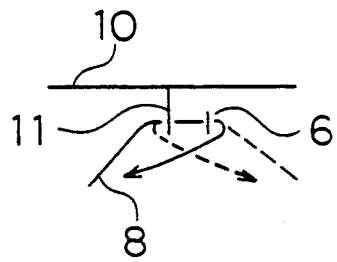

FIG. 9 shows the state where the lead wire 8 is disposed from the tongue 11 toward the tongue 6, folded back toward the tongue 11 in almost U shape, then connected to them.

Figure 10:
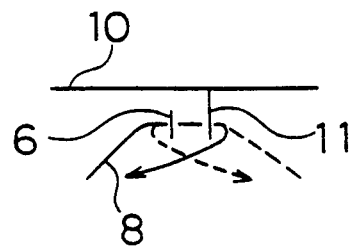

FIG. 10 shows the state where the lead wire 8 is disposed from the tongue 6 toward the tongue 11, folded back toward the tongue 6 in an almost U shape, and then connected to them.

As shown in dotted lines in FIGS. 9 and 10, the direction in which the lead wire 8 is connected may be reversed.

This invention having such a construction and operation as described above helps reduce the number of troublesome wire-end terminations to 1/N (N being the number of coils), compared with the conventional method for winding coils on a Y-connection armature. The wire-end termination according to this invention involves only an electrical connection by soldering or spot welding between the tongues and the lead wire, and the subsequent cutting of bridging wires. This eliminates the fear of loosening or separation of the tongues and the lead wire. Furthermore, this invention, which makes coil-winding process easy and simple, facilitates automation, leading to a substantial reduction in coil-winding operation and time, improved production efficiency and reduced cost.

What is claimed is:

1. A method for winding coils on a Y-connection armature for miniature motors, the motor including an armature iron core of a multi-pole construction, a commutator and a common terminal plate, each of said commutator and said common terminal plate being disposed in a mutually insulated state on an insulating cylinder fixedly fitted to an armature shaft, the method comprising the steps of:

winding a plurality of coils on said armature iron core; connecting lead wires of the coils to tongues of the commutator and the common terminal plate; extending ends of lead wires wound on coils, other than the last coil, across a predetermined commutator tongue and a tongue of said common terminal plate adjacent to said commutator tongue without being cut; connecting said lead wire to said tongues of said commutator and said common terminal plate; and subsequently cutting the lead wire disposed across said commutator tongue and said common terminal plate.

2. A method according to claim 1, wherein said step of extending ends of lead wires wound on coils across said predetermined commutator tongue and said tongue of said common terminal plate, adjacent to said commutator tongue includes extending said ends of said lead wires in an almost straight line.

3. A method according to claim 1, wherein said step of extending ends of lead wires wound on coils across said predetermined commutator tongue and said tongue of said common terminal plate, adjacent to said commutator tongue includes extending said ends of said lead wires in an almost α shape.

4. A method according to claim 1, wherein said step of extending ends of lead wound on coils across said predetermined commutator tongue and said tongue of said common terminal plate, tongue adjacent to said commutator tongue includes extending, said ends of said lead wires in an almost U-shape.

* * * * *